US012774195B2

(12) United States Patent
Bonfiglioli

(10) Patent No.: US 12,774,195 B2
(45) Date of Patent: Oct. 27, 2026

(54) VARIABLE FOOTPRINT HANDLING APPARATUS FOR HANDLING CONTAINERS

(71) Applicant: ACHA S.R.L., Bologna (IT)

(72) Inventor: Giancarlo Bonfiglioli, Castello d'Argile (BO) (IT)

(73) Assignee: ACHA S.R.L., Bologna (IT)

( * ) Notice: Subject to any disclaimer, the term of this patent is extended or adjusted under 35 U.S.C. 154(b) by 378 days.

(21) Appl. No.: 18/557,616

(22) PCT Filed: Mar. 22, 2022

(86) PCT No.: PCT/IB2022/052583
§ 371 (c)(1),
(2) Date: Oct. 27, 2023

(87) PCT Pub. No.: WO2022/229725
PCT Pub. Date: Nov. 3, 2022

(65) Prior Publication Data

US 2024/0208778 A1 Jun. 27, 2024

(30) Foreign Application Priority Data

Apr. 30, 2021 (IT) ........................ 102021000011087

(51) Int. Cl.
*B66C 19/00* (2006.01)
*B66C 19/02* (2006.01)

(52) U.S. Cl.
CPC ............ *B66C 19/007* (2013.01); *B66C 19/02* (2013.01)

(58) Field of Classification Search
CPC ..... B60P 1/6436; B60P 1/6445; B60P 1/6481; B60P 1/5471; B60P 1/54; B60P 3/42;
(Continued)

(56) References Cited

U.S. PATENT DOCUMENTS 3,224,613 A * 12/1965 George ................ B60P 1/6445 280/421
3,348,711 A 10/1967 Gove
(Continued)

FOREIGN PATENT DOCUMENTS

WO 9426554 A1 11/1994
WO 2010048674 A1 5/2010

*Primary Examiner* — Glenn F Myers
(74) *Attorney, Agent, or Firm* — FisherBroyles, LLP; Roger L. Browdy; Ronni S. Jillions

(57) ABSTRACT

A variable footprint handling apparatus (401.401') for handling containers (105) is described comprising: a first column (455) adapted to be associated with the fifth wheel (430) of a tractor (410). a second column (475) to which a first idle ground support wheel (480) is idly associated. a third column (500) to which a second idle ground support wheel (505) is idly associated. a lifting arrangement (540, 545.550,555.560,565.570,575,580.585) for lifting the container (105), and a connection arrangement (520,530,535) that connects the second column (475) and the third column (500) to the first column (455) and is configured to move at least one between the second column (475) and the third column (500) between a first position, wherein the distance of the third column (500) from the second column (475) is maximum, and a second position wherein said distance is minimum.

9 Claims, 10 Drawing Sheets

(58) Field of Classification Search
CPC ......... B60P 3/28; B66C 19/02; B66C 19/007; B66C 23/36; B66C 23/42; B66C 1/101; B66C 1/223
See application file for complete search history.

(56) References Cited

U.S. PATENT DOCUMENTS

| | | | | | |
|---|---|---|---|---|---|
| 4,120,413 | A * | 10/1978 | Harris | B60P 1/6445 414/460 |
| 7,811,044 | B2 * | 10/2010 | Warhurst | B60P 1/6445 414/458 |
| 7,866,933 | B2 * | 1/2011 | Welch | B60P 1/6445 414/458 |
| 9,919,637 | B1 * | 3/2018 | Dieleman | B60P 3/064 |
| 10,479,256 | B2 * | 11/2019 | Rezvanian | B60P 1/6445 |
| 2010/0135757 | A1 | 6/2010 | Welch et al. | |

* cited by examiner

VARIABLE FOOTPRINT HANDLING APPARATUS FOR HANDLING CONTAINERS

TECHNICAL FIELD

The present invention relates to a container handling apparatus (ISO) of the variable footprint type, i.e., capable of being arranged in a working configuration in which it allows containers to be lifted and lowered, for example to and from the carriage of an articulated truck, and a storage/transport configuration in which containers cannot be lifted or lowered. In particular, the footprint of the apparatus in the storage/transport configuration is smaller than the footprint in the working configuration, so that the apparatus can be transported on the carriage of a standard articulated truck and on normal roads open to the public.

PRIOR ART

Apparatuses are known for handling containers able to vary their footprint, intended as the set of the maximum height, width and length of the apparatus, in order to switch from a working configuration, in which they can lift/lower and transport by land a container, generally a single container or at most two containers, to a storage or transport configuration, in which the footprint of the apparatus is reduced compared to the working configuration, so that it can for example be transported on the truck of a standard articulated truck circulating on urban roads.

Such apparatuses generally comprise a variable footprint frame, for example comprising telescopic vertical side members and/or uprights, which variable footprint frame rests on the ground by means of at least 3, preferably four wheels, at least one, preferably two, of which are drive wheels in order to be able to move the frame and therewith the container which by means of an apparatus lifting arrangement has been associated with the container.

The apparatus is therefore provided with a motor, to provide the necessary force to the drive wheels to move the apparatus, and a cockpit to allow an operator to drive the apparatus. The motor may be a hydraulic motor that is driven by the fluid placed under pressure by a motor pump connected to the variable footprint frame.

As can be guessed, the motor and the cockpit have considerable footprints which do not match with the need to minimize the footprint of the apparatus in the storage/transport configuration. As can also be guessed that such components complicate and lengthen design/construction times and constitute a significant weight burden.

An object of the present invention is that of solving the aforesaid problems of the apparatuses of the prior art.

Such object is achieved by the features of the invention indicated in the independent claim. The dependent claims outline preferred and/or particularly advantageous aspects of the invention.

DISCLOSURE OF THE INVENTION

In particular, the invention makes available a variable footprint handling apparatus for handling containers comprising:

- a first column adapted to be associated to the fifth wheel of a tractor,
- a second column to which a first idle ground support wheel is idly associated,
- a third column to which a second idle ground support wheel is idly associated,

- a lifting arrangement for lifting the container,
- a connection arrangement that connects the second column and the third column to the first column and is configured to move at least one between the second column and the third column between a first position, wherein a distance of the third column from the second column is maximum, and a second position wherein said distance is minimum.

Thanks to this solution, an apparatus for handling containers, of the type with variable footprint, is made available which is more compact, light, easily transportable and economical, with the same performance, compared to prior art devices. In particular, such advantages are allowed by the fact that the apparatus does not need drive wheels to handle containers, as it can exploit the drive wheels of the tractor provided with fifth wheel (or any other equivalent connection element) to which the first column is adapted to be connected, for example associated in idle mode. Accordingly, since it does not need any drive wheels, it does not need to be provided with motors, generally hydraulic/oleodynamic, used by apparatuses of prior art to rotate the ground support wheels, nor with means for controlling and orienting the drive wheels and for driving the apparatus, since such means are also already included in the tractor. As also set forth below, the apparatus may comprise a pump, driven by an electric motor or endothermic motor, for generating pressurized fluid which allows the connection arrangement to be activated, which, since it does not also have to provide sufficient force to also activate the drive wheels, may be smaller than the apparatuses of prior art, and therefore less bulky. Moreover, it is not excluded that the apparatus may also not comprise an onboard pump to activate the connection arrangement and may be connected to a pump external to the apparatus, thus making it even lighter and more compact. The apparatus is also transportable on the carriage of a standard articulated truck on roads open to the public, as once it is brought into transport configuration does not protrude from the carriage of the articulated truck.

According to an aspect of the invention, designed to improve the compactness of the system when in the transport configuration while maintaining high functionality in the operating configuration, the connection arrangement may comprise:

- a first crosspiece provided with a first end connected to the first column and a second end connected to the third column,
- a second crosspiece provided with a first end rigidly fixed to the second column and a second end hinged to one between the first column and the first crosspiece with respect to a vertical axis of rotation,
- an actuator configured to move the second column in rotation with respect to said vertical axis of rotation.

Still another aspect of the invention provides that the actuator may be a linear actuator provided with a first end hinged to one between the first column, the first crosspiece and the third column and an opposite second end hinged to one between the second column and the second crosspiece.

Still another aspect of the invention provides that the third column and the second column may be of a telescopic type.

In this way it is possible, for the same footprint in the operating configuration, to reduce the footprint in the transport configuration.

Another aspect of the invention according to which the first column and the first crosspiece can be of the telescopic type may contribute to improve this advantage. In addition, this feature allows the column to be lifted to a point where the first crosspiece and the second crosspiece are above the tractor, thus allowing the apparatus to be brought in front of the tractor for better manoeuvrability, and at the same time allowing the apparatus to be loaded onto the carriage.

According to one aspect of the invention, the lifting arrangement may comprise:

a first arm connected to the second column and developing transversely thereto along a longitudinal direction, a second arm connected to the third column and developing transversely thereto along a longitudinal direction, a first container gripping body integral with a first rope at least partially wrapped around a first wheel hinged near a first end of the first arm distal from the second column and operated by means of a first actuator, a second container gripping body integral with a second rope at least partially wrapped around a second wheel hinged near a second end of the first arm distal from the second column and opposite to the first, and operated by means of a second actuator, a third container gripping body integral with a third rope at least partially wrapped around a third wheel hinged near a first end of the second arm distal from the third column and operated by means of a third actuator, a fourth container gripping body integral with a fourth rope at least partially wrapped around a fourth wheel hinged near a second end of the second arm distal from the third column and opposite the first, and operated by means of a fourth actuator, and wherein at least one between the first arm and the second arm is hinged to the respective column according to a vertical hinge axis.

In this way it is possible to reduce the footprint of the apparatus, which otherwise, if all the two arms were rigidly fixed, that is rigidly fixed without any residual degree of freedom with respect to the column, would touch each other, in the passage from the first position to the second position, well before the proposed solution, which allows at least one of the arms to adapt to the other, keeping them, for example, parallel instead of incident, and therefore allows to bring the second column and the third column closer one another.

According to another aspect of the invention, the apparatus may comprise a pump driven by a motor and operatively connected to the connection arrangement for moving the first column between the first and second position and wherein said pump and said motor are connected to one of said three columns or said connection arrangement.

According to an alternative embodiment of the invention, the second end of the first crosspiece may be hinged to the third column with respect to a first axis of rotation and wherein the first end of the second crosspiece may be hinged to the second column with respect to a second axis of rotation.

In this way it is possible to rotate the first and the second column in relation to the respective crosspieces of the connection arrangement, the apparatus thus makes it possible to keep the ground support wheels parallel to each other even when loads larger or smaller than an ISO container are handled. In the absence of such characteristics, outside of an optimal design distance between the third and the second column, in the other positions, since the wheels are hinged to the columns only with respect to horizontal axes of rotation, the wheels would roll on incident trajectories, and therefore would be forced to creep in case of movement of the apparatus on a straight axis.

The invention also makes available a system for handling containers comprising a tractor, provided with a fifth wheel, and an apparatus according to claim 1, wherein the first column is removably connected to the fifth wheel of the tractor.

BRIEF DESCRIPTION OF THE DRAWINGS

Further characteristics and advantages of the invention will become clear from reading the following description provided by way of non-limiting example, with the aid of the figures illustrated in the accompanying tables.

BEST MODE OF THE INVENTION

Figure 1:
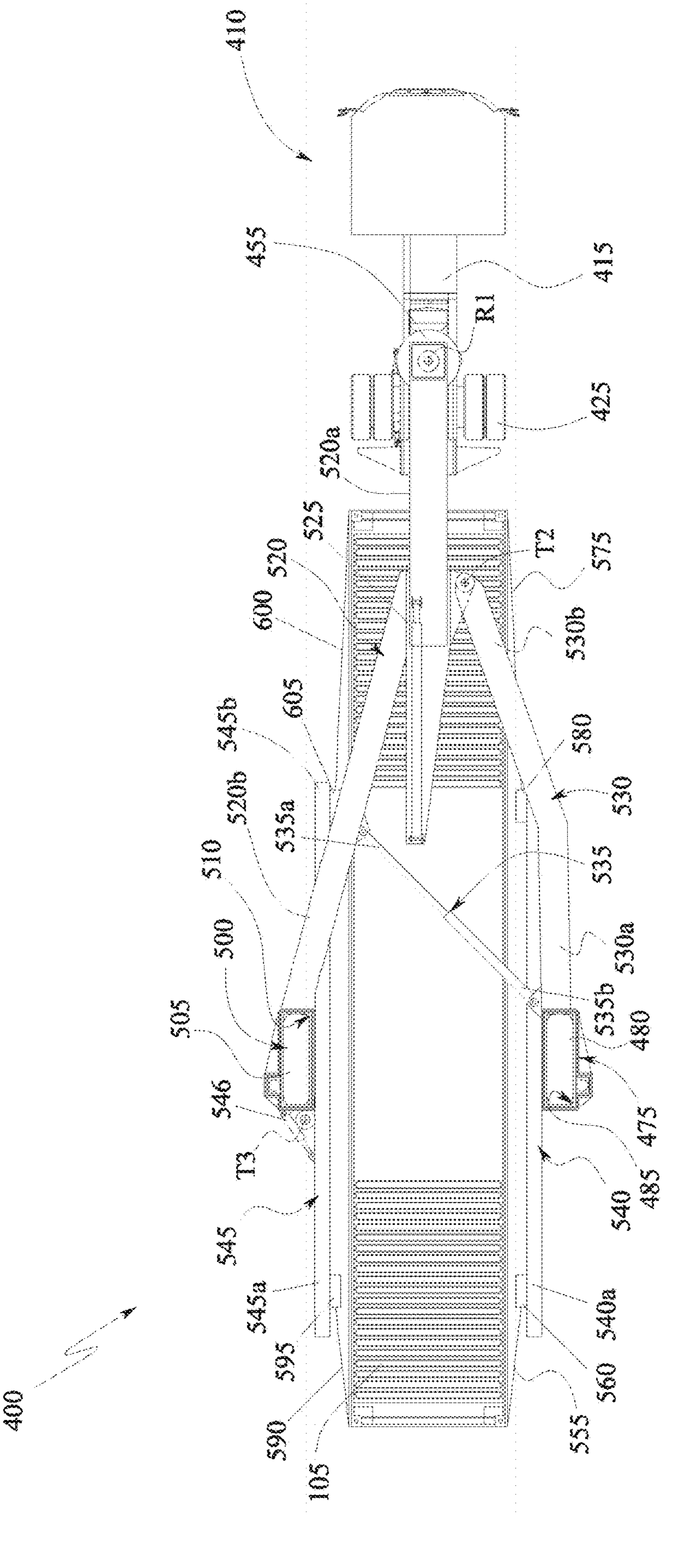
FIG. 1 is a schematic plan view of a container handling system according to the invention, comprising a container handling apparatus according to the invention, illustrated in a step of handling a container by land.
Figure 2:
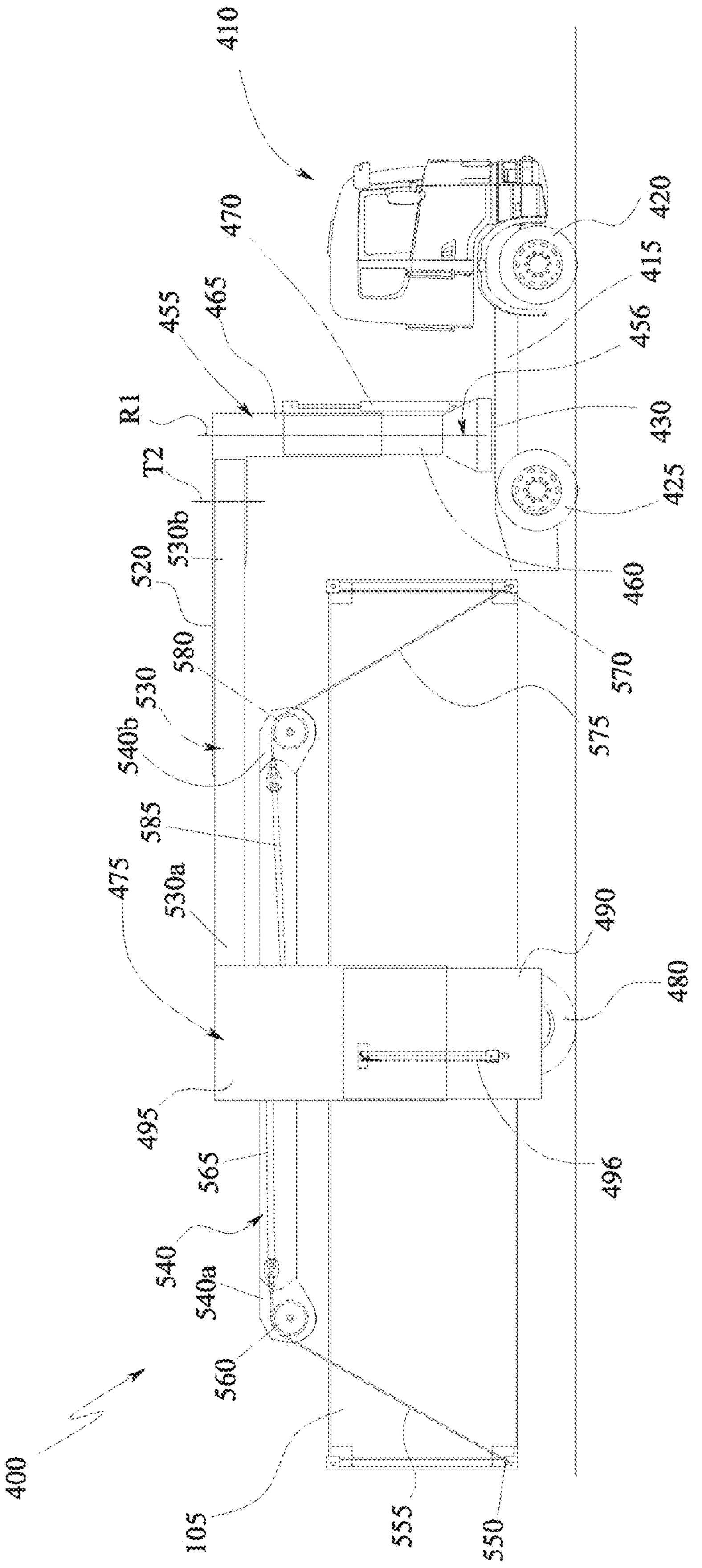
FIG. 2 is a schematic side view of the system of FIG. 1.

With particular reference to such figures, a system for handling containers 105 (ISO containers), in particular of the type capable of moving autonomously along roads and highways open to the public, has been globally indicated with 100. In the illustrated embodiments, there is a system 100 capable of handling a single container, however, with appropriate dimensional modifications of the system well within the reach of the person skilled in the art, the inventive concept underlying the system can be adapted to transport two containers stacked vertically one on top of the other.

The container 105 that can be handled by the system is preferably an ISO container (provided with coupling elements, for example in the form of pins and/or slots), adapted to be grasped by the system 100, for example by means of hooks.

The system 400 comprises a tractor 410, i.e., a self-propelled vehicle suitable for land transportation, which comprises a chassis 415 to which at least one pair of drive and steering wheels 420 or one pair of drive and one pair of steering wheels (and possibly, generally, at least one pair of idle wheels 425) are associated.

The tractor illustrated is that of an articulated vehicle, i.e., a self-propelled vehicle adapted to transport carriages resting on the ground by means of idle wheels, however it is not excluded that the tractor may be another self-propelled vehicle, such as a forklift.

It is specified that a carriage is defined as a frame having a flat upper surface for supporting goods, for example a container, and to which a plurality of ground support wheels, all of which are idle wheels, is associated. In practice, the carriage needs a tractor to be moved.

The tractor 410 comprises a motor (not illustrated), for generating the force necessary for the drive wheels to move the tractor, and a transmission (in the case where the motor is endothermic) for carrying the energy of the motor to the drive wheels.

The tractor 410 further comprises a steering system (not illustrated), for controlling the steering wheels or the steering and drive wheels, and a cockpit adapted to accommodate a tractor operator and controls for operating said tractor systems.

The tractor 410 comprises a fifth wheel 430 (internationally known) associated with the frame of the tractor and which is adapted to allow the removable connection of a carriage to be towed and which inferiorly supports a portion of said carriage.

Specifically, the fifth wheel 430 comprises a plate, provided with a substantially flat upper surface 435 (which is generally lubricated to reduce friction with the portion of the carriage placed on top of it), in which plate a recess 440 adapted to allow the insertion of a pin of the carriage, is made.

The fifth wheel then comprises a locking mechanism configured to selectively retain and release a pin (of the carriage) inserted inside the recess.

The cockpit is positioned in a front portion of the tractor, while the fifth wheel 430 is positioned in a rear portion of the tractor.

The system 100 further comprises a variable footprint handling apparatus 401,401' (hereinafter abbreviated as apparatus 401,401') for handling containers 105. In particular, the handling performed by the apparatus involves lifting, lowering and keeping the container suspended from the ground. By connecting the apparatus to the tractor 410, as will become clearer in the following, it then becomes possible to handle the container by moving it horizontally in space while the apparatus keeps the container suspended in the air.

The apparatus 401,401' is a variable footprint apparatus as it is able to vary its footprint between a working (or operating) configuration, in which it is possible to lift/lower and keep lifted a container (or a pair of containers) and a storage or transport configuration, in which the maximum overall footprint of the apparatus 401,401' is reduced compared to the working configuration.

It is specified that variable footprint means the possibility of varying at least one of its dimensions in the space between height, width and length. Width and length are perpendicular to each other and lie on a horizontal plane, whereas the height is measured vertically. Further, in this discussion, width will be used with reference to a measurement direction perpendicular to a straightforward direction of the tractor, in a condition where the apparatus 401,401' is connected to and aligned with the tractor (as is visible in the figures), and the length with reference to a measurement direction parallel to the straightforward direction of the tractor and perpendicular to the length.

The maximum overall footprint may be considered as the volume of the smallest parallelepiped that entirely contains the apparatus 401,401'.

The apparatus 401,401' comprises a variable footprint frame, also definable as “with variable geometry”, adapted to be removably connected to the tractor 410, namely to the fifth wheel 430 of the tractor, to be moved by it.

In the illustrated embodiment, the frame is capable of varying its footprint in all three indicated directions (height, width and length). However, it is not excluded that in a non-illustrated, and less preferred embodiment, the frame is capable of varying its footprint only in the direction of its width or in the direction of width and length, but not in height.

The variation in frame footprint allows the apparatus 401,401' to be operated between the operating configuration, in which it is capable of handling a container, i.e., lifting, lowering and keeping it suspended, and the transport or storage configuration, in which the apparatus 401,401' is adapted to be transported on the carriage of an articulated truck, i.e., a carriage connected to a tractor. In the transport configuration, the apparatus 401,401' is not configured to handle a container.

In the operating configuration the footprint of the frame (and of the apparatus 401,401') is maximum, while it is minimum in the transport or storage configuration.

Said variable footprint frame comprises a first column 455, which is vertical, i.e., it develops mainly longitudinally along a vertical axis, and is adapted to be removably connected to the tractor. In particular, the apparatus 401,401' is connected to the tractor only through the first column.

The first column 455 is adapted to be associated, i.e., is associated, idly with the fifth wheel 430 of the tractor so that the first column can rotate with respect to the tractor with respect to a vertical axis of rotation R1. Alternatively, the column may comprise a rigidly fixable lower portion, i.e., rigidly fixable without residual degrees of freedom, to fifth wheel 430 and the remainder of the first column is rotatably associated with respect to said lower end with respect to the vertical axis of rotation R1.

For the connection to the fifth wheel, the first column comprises a coupling arrangement located at a lower end 456 of the first column.

Such a coupling arrangement may, for example, be the one known to a person skilled in the art for fixing a carriage to the fifth wheel of the tractor and may comprise a pin (not illustrated) adapted to be inserted into the recess 440 of the fifth wheel 430. Obviously, it cannot be excluded that, as an alternative to the fifth wheel, the tractor could comprise a system for the ad hoc connection of the first column. In such a case, the tractor could, for example, comprise a vertical pin on which a lower portion of the first column is fitted so as to realize a rotoidal pair with a vertical axis of rotation R1.

In the illustrated embodiment, the first column is of a telescopic type and capable of varying its longitudinal extension along a vertical direction.

Thus, the first column comprises a lower section 460 that comprises the lower portion of the first column and an upper section 465 that is movable with respect to the lower section along a vertical direction, such as by means of a linear actuator 470.

The variable footprint frame then comprises a second column 475 (vertical, i.e., developing longitudinally along a vertical axis) to which a first idle ground support wheel 480 is associated idly. In practice, the second column rests on the ground (only) by means of the first idle wheel which is connected to a lower end of the second column. The first idle wheel 480 is rotatably associated with the second column 475 at least with respect to a horizontal axis of rotation. It is not excluded that the first idle wheel 480 may be rotatably associated idly with the second column 475 also with respect to a vertical axis of rotation, for example coaxial to a longitudinal axis of the column.

The first idle wheel 480 may be, at least partially, vertically aligned with the second column. Preferably, the second column entirely overlaps in plan the first idle wheel.

In the illustrated embodiment, in order to further reduce the footprints, the second column comprises a cavity 485 within which the first idle wheel 480 is at least partially contained.

For example, the second column could also comprise a drive configured to selectively let the first idle wheel protrude from the cavity (so that at least one-third of the wheel protrudes) and to let it retract into the cavity (so that less than one-quarter of the wheel protrudes from the cavity), so as to allow a further reduction in footprints and at the same time allow obstacles to be overcome when the wheel is caused to protrude.

It is not excluded that the second column may comprise more than one ground support wheel idly hinged to the second column.

In the embodiment illustrated, the second column is of a telescopic type and capable of varying its longitudinal extension along a vertical direction. In particular, the second column may comprise a lower section 490 to which the first idle wheel 480 is directly associated in the manner described above, and an upper section 495 movable with respect to the lower section 490 along a vertical axis. For example, the actuation of the second section may be through the linear actuator 496 shown in the figures.

The second column 475 is distinct and spaced by a non-zero amount from the first column.

The variable footprint frame also comprises a third column 500 (vertical, i.e., developing longitudinally along a vertical axis) to which a second idle ground support wheel 505 is associated idly. In practice, the third column rests on the ground (only) by means of the second idle wheel which is connected to a lower end of the third column.

The second idle wheel is rotatably associated with the third column 500 at least with respect to a horizontal axis of rotation. It is not excluded that the second idle wheel may be rotatably associated idly with the third column 500 also with respect to a vertical axis of rotation, for example coaxial to a longitudinal axis of the column.

The second idle wheel may be, at least partially, vertically aligned with the third column. Preferably, the third column entirely overlaps in plan the second idle wheel.

In the illustrated embodiment, in order to further reduce the footprints, the third column comprises a cavity 510 within which the second idle wheel is at least partially contained. For example, the third column could also comprise a drive configured to let the first idle wheel protrude from the cavity (so that at least one-third of the wheel protrudes) and to let it retract into the cavity (so that less than one-quarter of the wheel protrudes from the cavity), so as to allow a further reduction in footprints and at the same time allow obstacles to be overcome when the wheel is caused to protrude.

It is not excluded that the third column may comprise more than one ground support wheel hinged idly to the third column.

In the embodiment illustrated, the third column is of a telescopic type and capable of varying its longitudinal extension along a vertical direction. In particular, the third column may comprise a lower section to which the second idle wheel is directly associated in the manner described above, and an upper section movable with respect to the lower section along a vertical axis. For example, the actuation of the second section may be through the linear actuator y shown in the figures.

The third column 500 is distinct and spaced by a non-zero amount from both the first column 455 and the second column 475.

Preferably, the variable footprint frame does not comprise any other support columns other than the first column, the second column and the third column. In other words, the weight of the apparatus 401,401', and of any container associated therewith, is discharged towards the ground passing only through the first column, the second column and the third column.

Additionally, the apparatus 401,401', when in use, only touches the ground through the first idle wheel, the second idle wheel, and the tractor when the apparatus 401,401' is connected to the tractor (alternatively, the apparatus 401, 401' may be momentarily supported by a stand and/or a variable extension support foot).

The variable footprint frame comprises a connection arrangement connecting the second column 475 and the third column 500 to the first column 455 and is configured, for example thanks to actuators and linkages and/or joints, to move at least one of the three columns with respect to another of the three columns between a first position (in which the apparatus 401,401' has a predetermined footprint in plan), e.g., wherein the footprint in plan of the apparatus 401,401', i.e., of the variable footprint frame, is maximum, and a second position, wherein the footprint in plan of the apparatus 401,401', i.e., of the variable footprint frame, in said second position is smaller than the footprint in plan of the apparatus 401,401' in said first position.

It should be noted that the footprint in plan is the width and length of the frame from a plan viewpoint. Alternatively, this footprint in plan can be understood as the area of a triangle lying on a horizontal plane and the vertices thereof are positioned in the respective columns.

The first position of the connection arrangement is the one that must be assumed to achieve the operating configuration of the apparatus 401,401' in which it allows to transport a container, while the second position must be assumed to achieve the transport configuration of the apparatus 401, 401'.

In the first position, the container to be lifted, or lowered, or which is kept lifted by the apparatus 401,401', is interposed (directly) between the first column, the second column and the third column.

The direction in which to measure the width of the apparatus 401,401' may also be defined as the direction of the horizontal distance between the second column 475 and the third column 500 when the connection arrangement is in the first position.

In the illustrated embodiment, the connection arrangement is configured to move at least one between the second column and the third column between a first position, wherein the (minimum and horizontal) distance of the third column from the second column is maximum, and a second position wherein said distance is minimum.

When the connection arrangement is in the first position, the second column and the third column are placed substantially at the same distance (horizontally) from a vertical centreline plane of the apparatus 401,401' that intersects the first column and is interposed between the second column and the third column.

In the passage between the first position and the second position, the distance of the second column from the first column and the distance of the third column from the first column remain unchanged.

In practice, the connection arrangement is configured to bring the third column and the second column closer to and further away from each other, for example by placing at least one of them in rotation with respect to a vertical axis of rotation.

In the illustrated embodiment, the connection arrangement comprises a first crosspiece 520 provided with a first end 520*a* connected, for example without residual degrees of freedom, to the first column 455, that is to a top portion (of the upper section) of the first column, and an opposite second end 520*b* connected, for example without residual degrees of freedom, to the third column 500, that is to a top portion (of the upper section) of the third column.

For example, the first crosspiece is arranged horizontally.

The first crosspiece 520 is preferably telescopic so as to vary a horizontal distance between its first end 520*a* and its second end 520*b*. This makes it possible to vary the horizontal distance between the first column 455 and the second column 475 and thus improve the compactness of the variable footprint frame. In particular, as will become clear in the following, the illustrated embodiment combined with the first telescopic crosspiece allows the horizontal distance of the third column and of the second column to be varied with respect to the first column.

Thus, the first crosspiece may comprise a first section comprising the first end 520*a* and a second section comprising the second end 520*b* that is movable with respect to the first section along a straight axis by means of a linear actuator 525.

The first crosspiece comprises only said ends and is directly connected only to the first column and to the third column.

The first crosspiece, in order to improve the footprints, is shaped so that from a plan viewpoint the first section is inclined with respect to the second section. For example, the longitudinal axes of these sections intersect and form an obtuse angle (comprised between 90° and 180°) facing the first crosspiece. Basically, the second section develops from the first section in the direction away from the second column.

The connection arrangement also comprises a second crosspiece 530 provided with a first end 530*a* rigidly fixed (without residual degrees of freedom) to the second column 475, that is to the top portion (of the upper section) of the second column 475, and an opposite second end 530*b* hinged to one between the first crosspiece, i.e., the second section of the first crosspiece, and the first column, with respect to a vertical axis of rotation T2. In the illustrated embodiment, the second end is hinged to the second section of the first crosspiece, so that it is possible to vary the horizontal distance of the third column and of the second column with respect to the first column through the telescopic element of the first crosspiece.

The second crosspiece comprises only said ends and for example is directly connected only to the second column and to the first crosspiece. For example, the second crosspiece is arranged horizontally.

In the illustrated embodiment, the second crosspiece is preferably inextensible. However, it is not excluded that in an alternative embodiment it may be telescopic so as to be able to vary a horizontal distance between its first end and its second end.

The first and the second crosspiece are placed at such a vertical height that they are entirely above the handled container, without interfering with it.

The connection arrangement further comprises an actuator 535 configured to move the second column in rotation with respect to said axis of rotation T2 and with respect to the first crosspiece, that is to move the second crosspiece 530, to which the second column is rigidly fixed, with respect to the axis of rotation T2 and with respect to the first crosspiece.

The rotation of the third column with respect to the axis of rotation T2 by means of the actuator 535 allows the connection arrangement to be operated between the first position and the second position of the connection arrangement.

For example, the actuator 535 is a linear actuator provided with a first end 535*a* hinged to one between the first column 455 and the first crosspiece 520 and an opposite second end 535*b* hinged to one between the second column 475 and the second crosspiece 530.

The actuator comprises a first portion provided with the first end and a second portion provided with the second end and movable with respect to the first portion along a straight axis. Such a straight axis preferably lies on a horizontal axis.

Specifically, in the illustrated embodiment, the first end 535*a* is hinged to the first crosspiece and the second end is hinged to the second crosspiece.

The actuator is preferably of the oleopneumatic type.

It is not excluded that, in an alternative less preferred non-illustrated embodiment, the connection arrangement may comprise a horizontally arranged telescopic crosspiece connecting the second column to the first column, and which by varying its longitudinal extension allows the first and he second position of the connection arrangement to be achieved by bringing the second column and the third column closer to and further away from each other. This telescopic crosspiece would be perpendicular to a vertical centreline plane passing through the first column and interposed between the second column and the third column.

Connected to the variable footprint frame is a lifting arrangement for lifting the container (with respect to the ground, i.e., with respect to a vertical height of the wheels), i.e., configured to allow the container to be lifted, kept lifted and lowered.

Said lifting arrangement is provided with a first portion (directly) connected to the second column and a second portion (directly) connected to the third column.

Each of said portions is provided with a coupling element, or lower container support, operable at least along a vertical direction for lifting, keeping lifted and lowering, the container.

Connected to the variable footprint frame is a lifting arrangement for lifting the container (with respect to the ground, i.e., with respect to a vertical height of the wheels), i.e., configured to allow the container to be lifted, kept lifted and lowered. Said lifting arrangement is provided with a first portion (directly) connected to the second column and a second portion (directly) connected to the third column.

Each of said portions is provided with a coupling element, or lower container support, operable at least along a vertical direction for lifting, keeping lifted and lowering, the container.

The lifting arrangement comprises a first arm 540 connected to the second column 475 and developing transversely thereto along a longitudinal (horizontal) direction, and a second arm 545 connected to the third column and developing transversely thereto along a longitudinal (horizontal) direction. In particular, the arms are each connected to the respective column in a respective central portion thereof, such that longitudinal ends of the arms are distal from the respective column.

At least one of said arms is idly hinged to the respective column to which it is connected with respect to a vertical axis of rotation T3.

For example, the second arm is hinged to the third column according to the vertical hinge axis T3.

The first arm 540 and the second arm 545 are for example straight, preferably they are conformed as straight bars arranged with a horizontal longitudinal axis.

In the illustrated embodiment, the connection arrangement may comprise an actuator 546 configured to place the second arm in rotation with respect to the corresponding vertical hinge axis T3.

As an alternative to the actuators, there may be a mechanism for locking and unlocking the rotation of the arms with respect to the columns.

The connection arrangement then comprises:

a first container gripping body 550, such as a first hook, integral with a first rope 555 at least partially wrapped around a first wheel 560 (idly) hinged near a first end 540*a* of the first arm 540 distal from the second column 475 and operated by means of a first actuator 565, a second container gripping body 570, such as a second hook, integral with a second rope 575 at least partially wrapped around a second wheel 580 (idly) hinged near a second end 540*b* of the first arm 540 distal from the second column 475 and opposite to the first end 540*a*, wherein the second rope is operated by means of a second actuator 585, a third container gripping body (not illustrated), such as a third hook, integral with a third rope 590 at least partially wrapped around a third wheel 595 (idly) hinged near a first end 545*a* of the second arm 545 distal from the third column 500 and operated by means of a third actuator (not illustrated), a fourth container gripping body (not illustrated), for example a fourth hook, integral with a fourth rope 600 at least partially wrapped around a fourth wheel 605 (idly) hinged near a second end 545*b*, opposite to the first, of the second arm distal from the third column 500 and opposite to the first, and operated by means of a fourth actuator (not illustrated).

The non-illustrated parts connected to the second arm are identical to the corresponding parts connected to the first arm.

It is not excluded that in an alternative embodiment, the actuation arrangements may comprise linear actuators provided with one end associated (e.g., rigidly or hinged) with the respective arm and an opposite end to which the respective gripping body is connected (e.g., rigidly or hinged). In such an embodiment, the gripping body could be a fork of the type used in forklifts, or a hook.

In a non-illustrated embodiment, the lifting arrangement may comprise at least two pairs of forks, wherein one pair is rigidly connected to the upper section of the second column and the other pair is rigidly connected to the upper portion of the third column. In this way by means of the telescopic columns it is possible to lift a container while pushing it from below, after having inserted the forks underneath the container.

The apparatus 401,401' may comprise a pump (not illustrated) driven by a motor (not illustrated) and operatively connected to the connection arrangement for moving the first column between the first and the second position, i.e., for powering the actuator of the connection arrangement.

As can be guessed, such a pump can also be used to power other actuators that may be present when certain elements are telescopic, such as the columns, for example. These pumps and motor are smaller in size than those of the prior art devices, as they need to power only the drives of the variable geometric frame and do not need to also drive the wheels to move the frame.

Said pump and said motor are connected to one of the three columns or to the connection arrangement.

The operating configuration of the apparatus 401,401', i.e., of the variable footprint frame, occurs when the connection arrangement is in its first position and all the telescopic columns are in their position of maximum longitudinal extension.

In the illustrated embodiment, the operating configuration occurs when the connection arrangement is in its first position, all telescopic columns are in their position of maximum longitudinal extension, the idle wheels protrude at least one-third from the cavity and the spacer bars are interposed between the arms of the lifting arrangement. The operating configuration coincides with when the connection arrangement is in the first position only in the less preferred embodiment in which the columns are not telescopic, the wheels are not within cavities made in the columns and are movable with respect to said cavities, and the lifting arrangement comprises forks that are vertically movable along the columns instead of hinged arms.

The transport configuration of the apparatus 401,401', i.e., the variable footprint frame, occurs when the connection arrangement is in its second position and all the telescopic columns are in their position of minimum longitudinal extension.

In the illustrated embodiment, the transport configuration occurs when the connection arrangement is in the second position, all telescopic columns are in their position of minimum longitudinal extension, the idle wheels protrude less than a quarter from the cavity, the first crosspiece is in its position of minimum longitudinal extension, and the spacer bars are not interposed between the arms of the lifting arrangement.

The transport configuration coincides with when the connection arrangement is in the second position only in the less preferred embodiment in which the columns are not telescopic, the first crosspiece is not telescopic, the wheels are not within cavities made in the columns and are movable with respect to said cavities, and the lifting arrangement comprises forks that are vertically movable along the columns.

The apparatus 401,401' illustrated can be connected to any tractor, i.e., a tractor of an articulated truck, provided it has a fifth wheel. Alternatively, it is possible to assume the use of a special tractor, provided with the fifth wheel (or alternatively with an arrangement for fixing the apparatus comprising a pin or a circular seat that allow to remotely associate the apparatus 401,401' to the special tractor, forming a rotoidal pair with a vertical axis of rotation with the first column of the apparatus 401,401'. For example, such a tractor could be an adapted forklift or other self-propelled industrial vehicle.

The system, in order to facilitate loading the apparatus onto the carriage to allow it to be transported when the apparatus is in a transport configuration, may comprise a stand 610 having a pair of horizontal, telescopic upper crosspieces that are positioned side-by-side and parallel to each other and are configured to extend and retract while the connection arrangement is operated between the first and the second position by inferiorly supporting the first and the second crosspiece and following them in the movement leading to the passage between the second and the first position.

Figure 8:
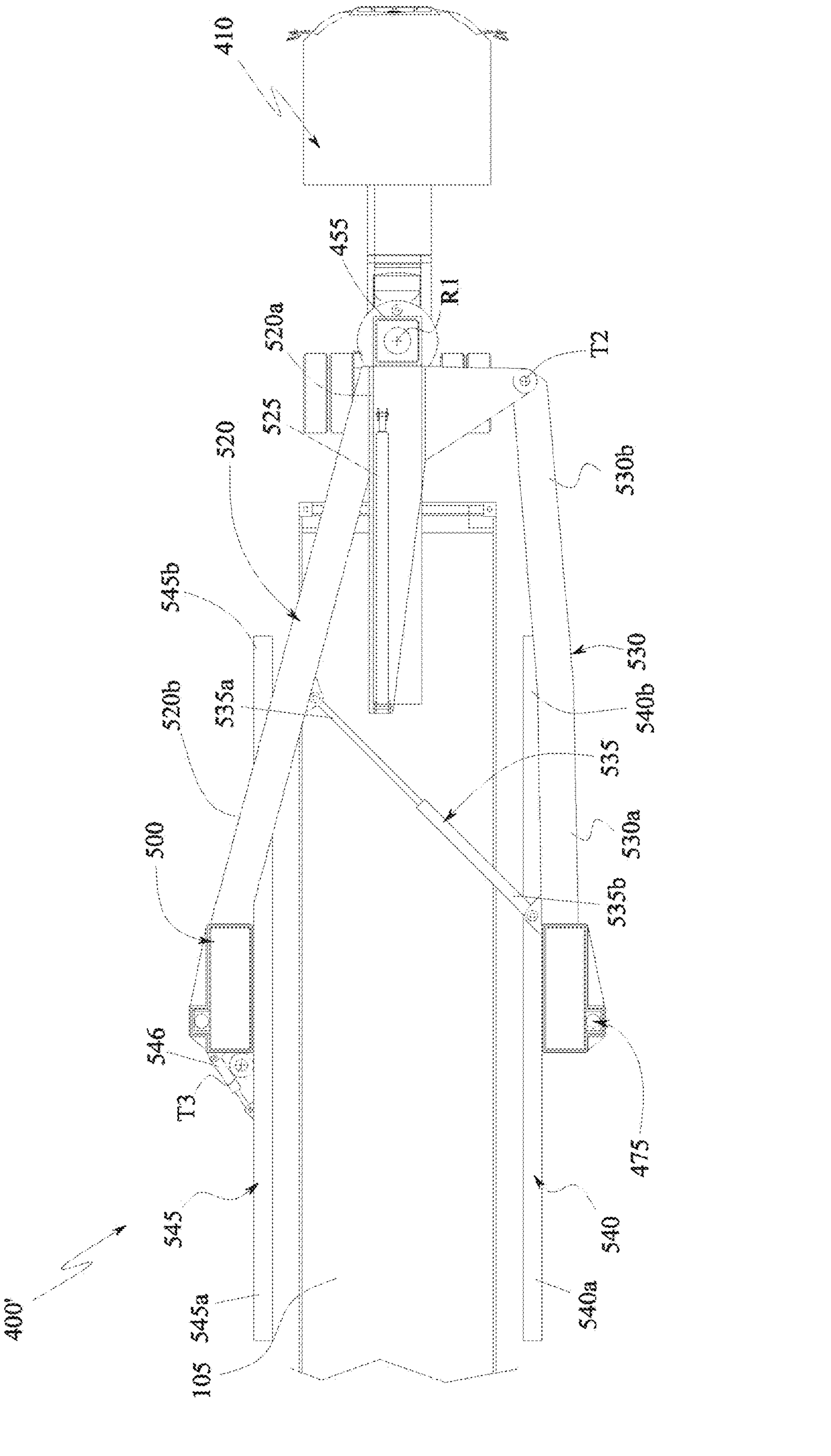
FIG. 8 is a schematic plan view of an alternative embodiment of the system according to the invention, illustrated in a step of handling a container by land.
Figure 9:
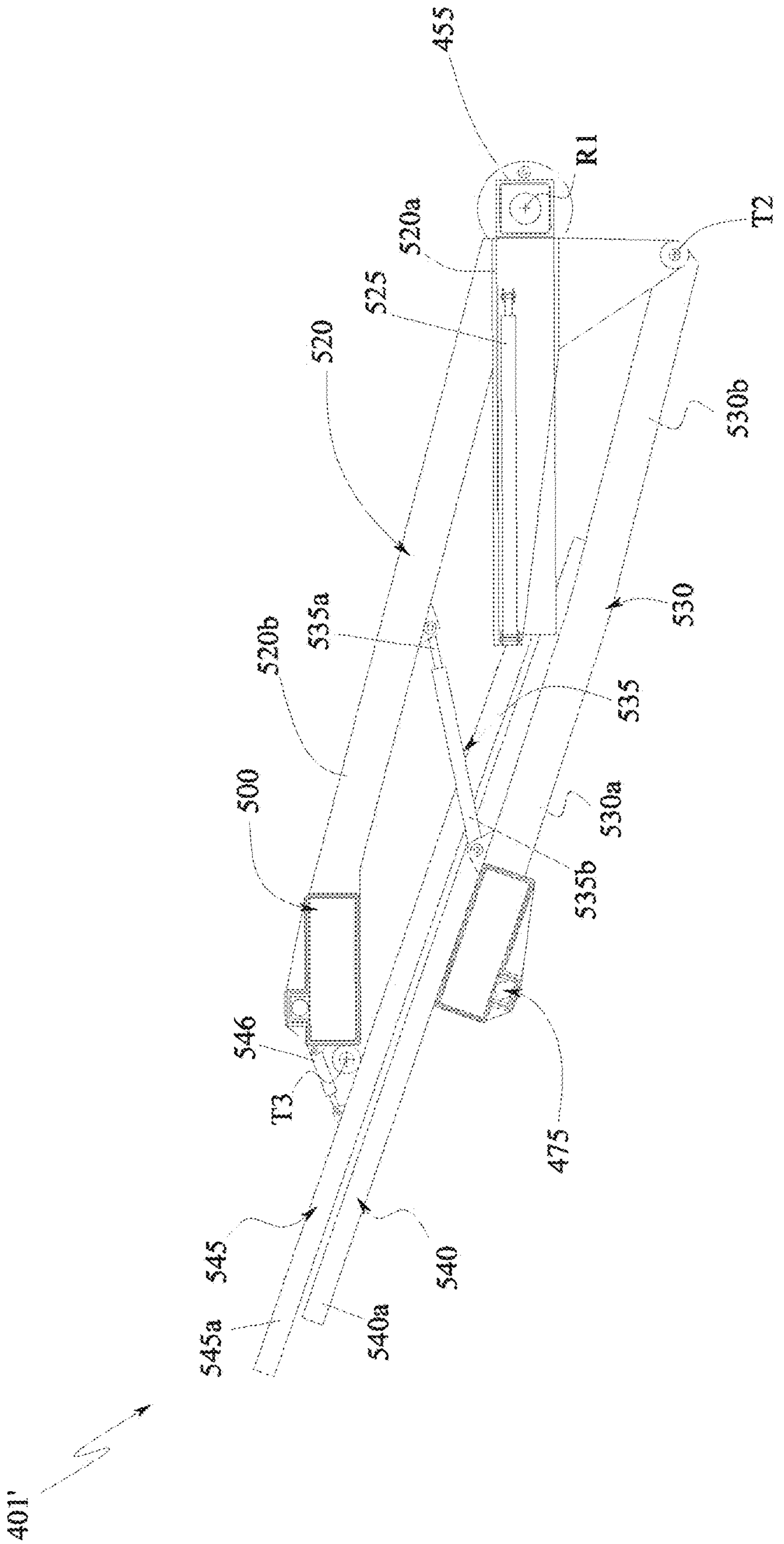
FIG. 9 is a schematic plan view of an apparatus of the system of FIG. 8, illustrated in a transport configuration.

FIGS. 8 and 9 illustrate an alternative embodiment of the system 400' according to the invention, wherein the apparatus 401' differs from the apparatus 400 solely in that the second crosspiece is hinged to the first crosspiece by means of an appendage protruding from the first crosspiece along a horizontal direction and transverse to a longitudinal axis of the first crosspiece, i.e., of the first section of the first crosspiece. In particular, said appendage has an extension in the direction in which it protrudes from the first crosspiece that is greater than a maximum width of the first crosspiece measured along a direction transverse to the longitudinal axis thereof.

Figure 10:
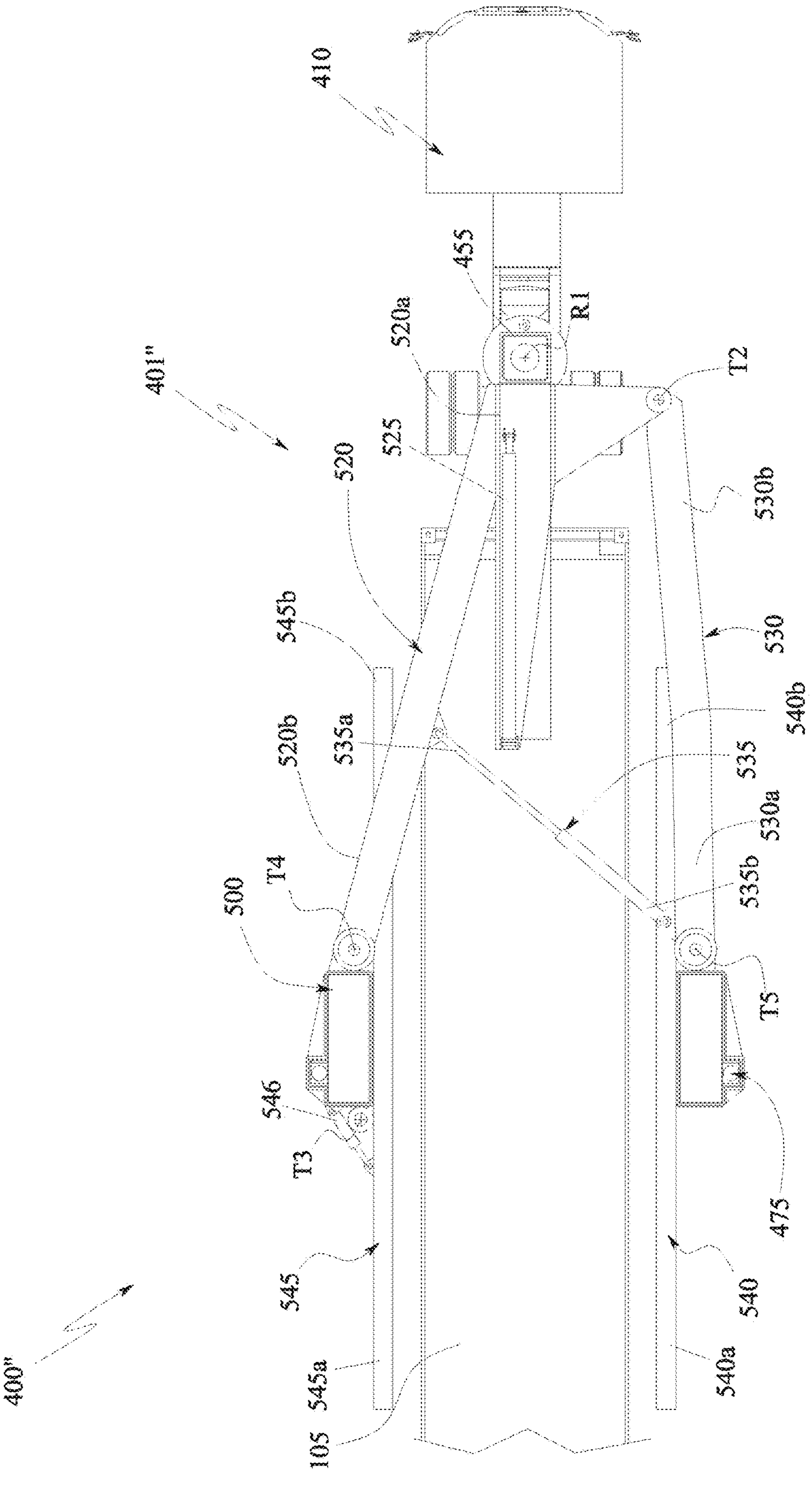
FIG. 10 is a schematic plan view of an alternative embodiment of the apparatus according to the invention.

FIG. 10 illustrates another embodiment of the system, indicated as 400", which differs from the system 400' in that it comprises an apparatus 401" in which the second end 520*b* of the first crosspiece may be hinged to the third column, that is to a top portion (of the upper section) of the third column, with respect to a vertical axis of rotation T4, and wherein the first end 530*a* of the second crosspiece may be hinged to the second column, that is to a top portion (of the upper section) of the second column, with respect to a vertical axis of rotation T5.

In such a case, the apparatus may comprise a first locking mechanism (not illustrated) operable at least between a first position, in which it allows a rotation of the third column with respect to the first crosspiece, and a second position, in which it locks the relative rotation between the first crosspiece and the third column.

Said mechanism may comprise an actuator (not illustrated) configured to move the third column in rotation with respect to said axis of rotation T4, that is to move the third column in rotation with respect to the first crosspiece, and to selectively lock the relative angular position between said third column and first crosspiece.

The apparatus may also comprise a second locking mechanism (not illustrated) operable at least between a first position, in which it allows a rotation of the third column with respect to the first crosspiece, and a second position, in which it locks the relative rotation between the second crosspiece and the second column.

Said mechanism could comprise an actuator (not illustrated) configured to move the second column in rotation with respect to said axis of rotation T5, that is to move the second column in rotation with respect to the second crosspiece, and to selectively lock the relative angular position between said second column and said second crosspiece.

It is not excluded that in an alternative embodiment not illustrated, the columns are connected to the crosspieces like in the embodiments 400 and 400', but the ground support wheels could also be hinged to the respective columns with respect to vertical axes of rotation.

The operation of the system 400,400',400" according to the invention is the following.

Figure 4:
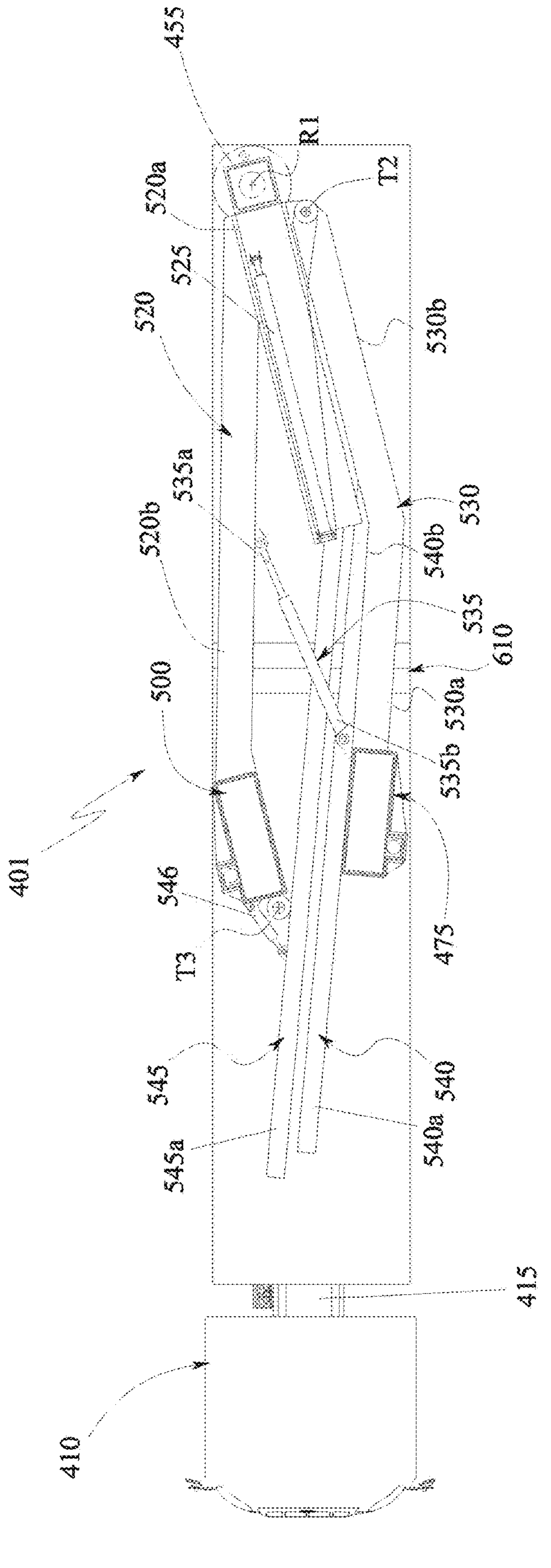
FIG. 4 is a schematic side view of the container handling apparatus of the preceding figures, illustrated in a transport configuration while being transported on a carriage of an articulated truck.
Figure 5:
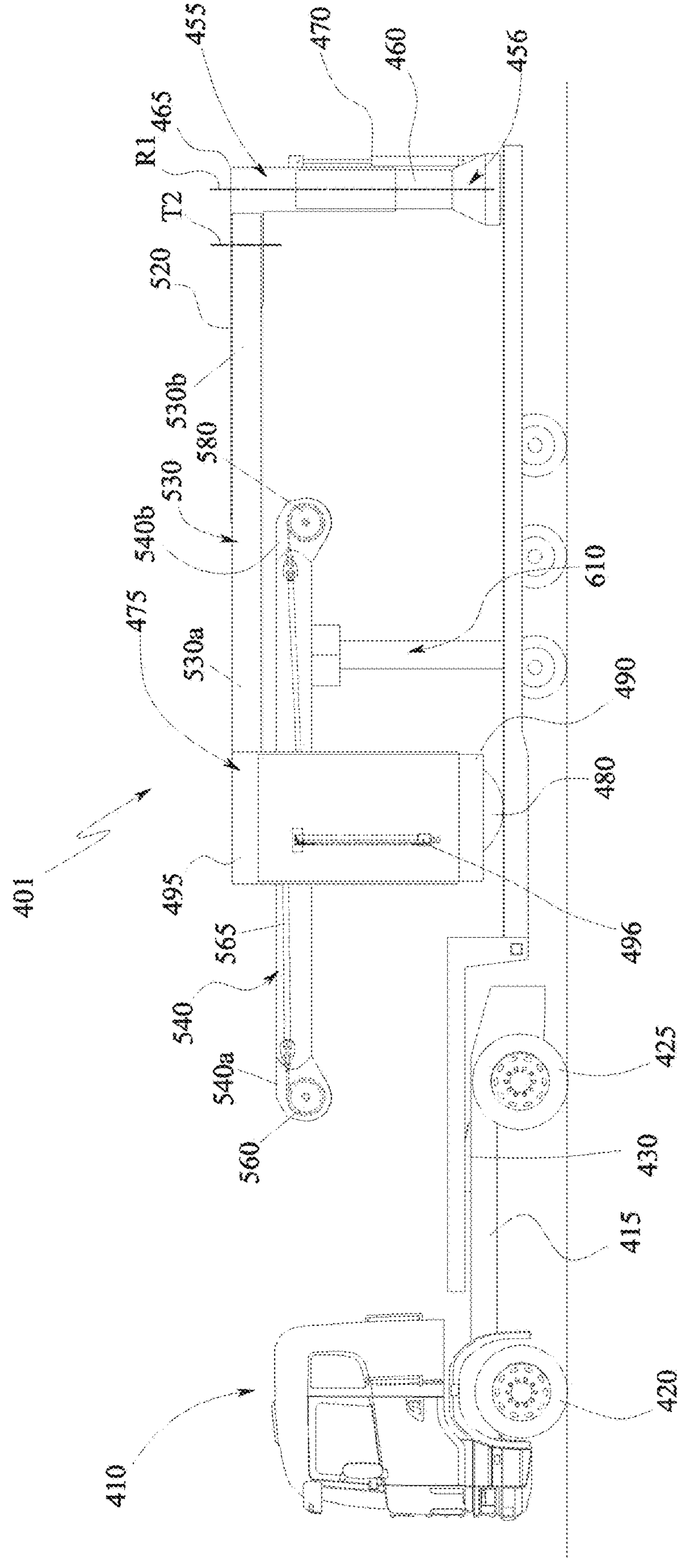
FIG. 5 is a schematic side view of what is illustrated in FIG. 4.

The apparatus is transported in a transport configuration positioned above a carriage pulled by a tractor that takes it where it is supposed to be used to handle containers (see FIGS. 4 and 5).

Once they have reached destination, the apparatus is brought from the transport configuration into the operating configuration supporting it during this transition, for example by placing it on the special stand 610 or by means of a forklift or by lifting it by means of a crane.

First of all, in the passage from the transport configuration to the operating configuration, the drive of the connection arrangement that places the second crosspiece 530 in rotation with respect to the vertical axis of rotation T2 is operated in order to bring it from the second position into the first position. After that, the first column 455 can already be connected to the fifth wheel 430 of the tractor.

If the columns are telescopic, like the one illustrated, the columns and possibly also the first crosspiece are extended.

Figure 6:
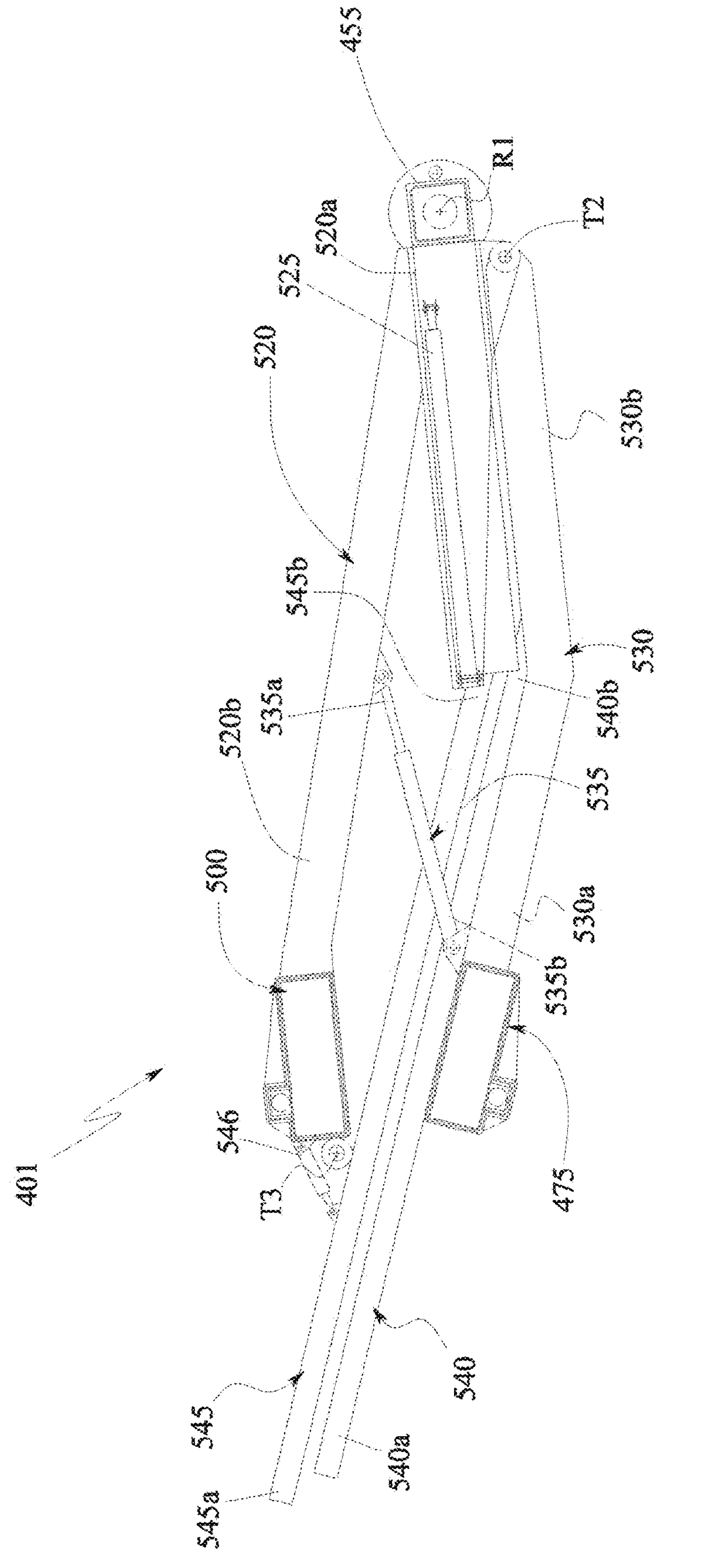
FIG. 6 is a schematic plan view showing the apparatus in a transport configuration.
Figure 7:
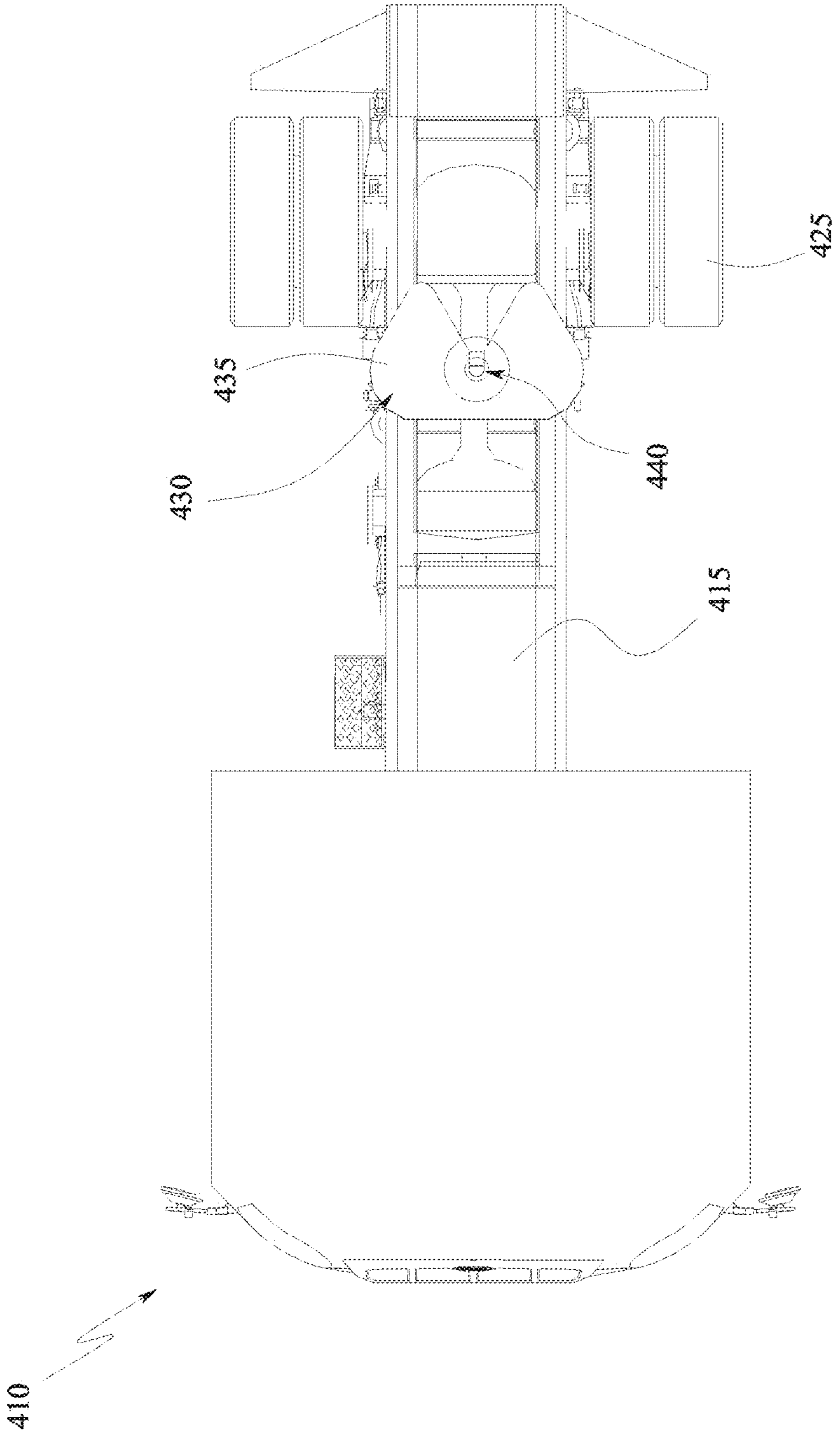
FIG. 7 is a schematic plan view of a tractor of the system of the preceding figures.

Again in the illustrated case, wherein the lifting arrangement comprises the arms 540,545, from the position visible in plan in FIG. 6, they are to be rotated with respect to their respective vertical hinge axes, for example by means of the actuators provided, so that, having reached the first position of the connection arrangement, the arms are arranged with longitudinal axes parallel to each other and parallel to a vertical centreline plane of the apparatus equidistant from the third and second column and intersecting the first column.

Once the apparatus is in operating configuration and connected to the tractor, the apparatus is moved by the tractor at the container to be lifted, positioning it so that the container is between the first column, the second column and the third column.

In the illustrated embodiment, the container is also interposed in plan between the first arm and the second arm, which flank the container laterally.

At this point, the container is grasped by the gripping bodies of the lifting arrangement and lifted so that it does not touch the ground or the carriage on which the container is placed.

Figure 3:
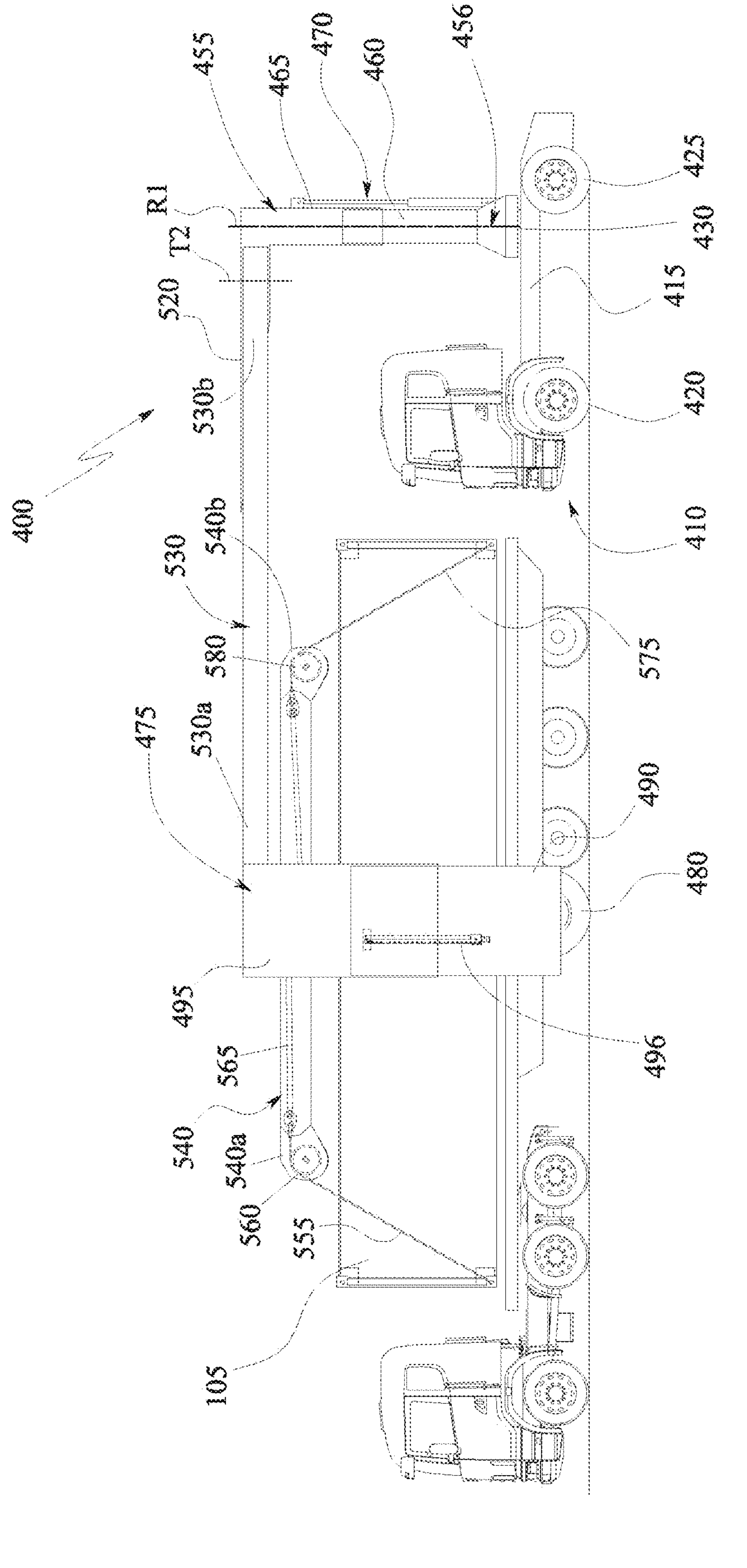
FIG. 3 is a schematic side view of the container handling system of the preceding figures, illustrated in a step of picking up or unloading a container with respect to a carriage of an articulated truck.

While the apparatus keeps the container lifted, the tractor moves the apparatus to the place where the container is to be unloaded, i.e., lowered. For example, thanks to the first telescopic column, the first crosspiece can be placed at a higher height than a portion of the top of the tractor, so that the tractor can be oriented such that the second and the third column, and hence the lifting arrangement, are in front of the cockpit (as illustrated in FIG. 3).

Once the apparatus has completed its work, it can be brought back from the transport configuration to store it on the working place or take it to another place (working or storage).

In the case of the illustrated system, it is possible to place the first and the second crosspiece on the stand 610, which, by means of its telescopic crosspieces, is able to support the crosspieces at the bottom while they pass from the first position to the second position.

If the columns and the first crosspiece are telescopic like in the case illustrated, they are also brought to their position of minimum longitudinal extension.

The second arm 545, as the connection arrangement passes from the first to the second position, is rotated so that it does not touch the first arm, which being connected to the second column rotates about the vertical axis of rotation T2 together with it, with the result that its first end 545*a* would soon touch the second arm if it were not rotated about the axis T3, for example so as to keep the second arm parallel to the first arm while the first arm rotates about the vertical axis of rotation T2.

The invention thus conceived is susceptible to several modifications and variations, all falling within the scope of the inventive concept. Moreover, all details can be replaced by other technically equivalent elements.

In practice, the materials used, as well as the contingent shapes and sizes, can be whatever according to the requirements without for this reason departing from the scope of protection of the following claims.

The invention claimed is:

1. A variable footprint handling apparatus for handling containers comprising:

a first column adapted to be associated with the fifth wheel of a tractor,
a second column to which a first idle ground support wheel is idly associated,
a third column to which a second idle ground support wheel is idly associated,
a lifting arrangement for lifting the one container of said containers,
a connection arrangement that connects the second column and the third column to the first column and is configured to move at least one of between the second column and the third column between a first position, wherein the distance of the third column from the second column is maximum, and a second position wherein said distance is minimum,
wherein the connection arrangement comprises:
a first crosspiece provided with a first end connected to the first column and a second end connected to the third column,
a second crosspiece provided with a first end rigidly fixed to the second column and a second end hinged to one between the first column and the first crosspiece with respect to a vertical axis of rotation,
an actuator configured to move the second column in rotation with respect to said vertical axis of rotation.

2. The apparatus according to claim 1, wherein the actuator is a linear actuator provided with a first end hinged to one between the first column, the first crosspiece and the third column and an opposite second end hinged to one between the second column and the second crosspiece.

3. The apparatus according to claim 1, wherein the third column and the second column are of the telescopic type.

4. The apparatus according to claim 1, wherein the first column and the first crosspiece are of the telescopic type.

5. The apparatus according to claim 1, wherein the lifting arrangement comprises:
a first arm connected to the second column and developing transversely thereto along a longitudinal direction,
a second arm connected to the third column and developing transversely thereto along a longitudinal direction,
a first container gripping body integral with a first rope at least partially wrapped around a first wheel hinged near a first end of the first arm distal from the second column and operated by means of a first actuator,
a second container gripping body integral with a second rope at least partially wrapped around a second wheel hinged near a second end of the first arm distal from the second column and opposite to the first, and operated by means of a second actuator,
a third container gripping body integral with a third rope at least partially wrapped around a third wheel hinged near a first end of the second arm distal from the third column and operated by means of a third actuator,
a fourth container gripping body integral with a fourth rope at least partially wrapped around a fourth wheel hinged near a second end of the second arm distal from the third column and opposite the first, and operated by means of a fourth actuator, and
wherein at least one between the first arm and the second arm is hinged to the respective column according to a vertical hinge axis.

6. The apparatus according to claim 1, comprising a pump driven by a motor and operatively connected to the connection arrangement for moving the first column between the first and the second position and wherein said pump and said motor are connected to at least one between the first, the second or the third column or to the connection arrangement.

7. The apparatus according to claim 1, wherein the second end of the first crosspiece is hinged to the third column with respect to a vertical axis of rotation, and wherein the first end of the second crosspiece is hinged to the second column with respect to a vertical axis of rotation.

8. A system for handling containers comprising a tractor, provided with a fifth wheel, and an apparatus according to claim 1, wherein the first column is removably connected to the fifth wheel of the tractor.

9. A variable footprint handling apparatus for handling containers comprising:
a first column adapted to be associated with the fifth wheel of a tractor,
a second column to which a first idle ground support wheel is idly associated,
a third column to which a second idle ground support wheel is idly associated,
a lifting arrangement for lifting a container of said container,
a connection arrangement that connects the second column and the third column to the first column and is configured to move at least one of between the second column and the third column between a first position, wherein the distance of the third column from the second column is maximum, and a second position wherein said distance is minimum,
wherein the lifting arrangement comprises:
a first arm connected to the second column and developing transversely thereto along a longitudinal direction,
a second arm connected to the third column and developing transversely thereto along a longitudinal direction,
a first container gripping body integral with a first rope at least partially wrapped around a first wheel hinged near a first end of the first arm distal from the second column and operated by means of a first actuator,
a second container gripping body integral with a second rope at least partially wrapped around a second wheel hinged near a second end of the first arm distal from the second column and opposite to the first, and operated by means of a second actuator,
a third container gripping body integral with a third rope at least partially wrapped around a third wheel hinged near a first end of the second arm distal from the third column and operated by means of a third actuator,
a fourth container gripping body integral with a fourth rope at least partially wrapped around a fourth wheel hinged near a second end of the second arm distal from the third column and opposite the first, and operated by means of a fourth actuator, and
wherein at least one between the first arm and the second arm is hinged to the respective column according to a vertical hinge axis.

* * * * *